Figure 1:
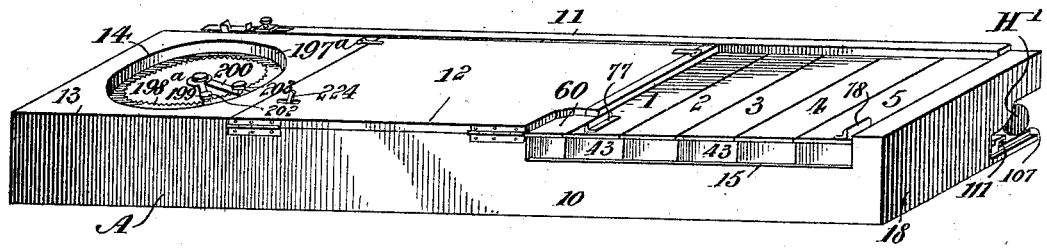

No. 638,092. Patented Nov. 28, 1899.
M. S. CARMONA.
TYPE WRITING MACHINE.
(Application filed Feb. 4, 1898.)
(No Model.) 7 Sheets—Sheet 1.

WITNESSES:

INVENTOR
M. S. Carmona
BY
ATTORNEYS.

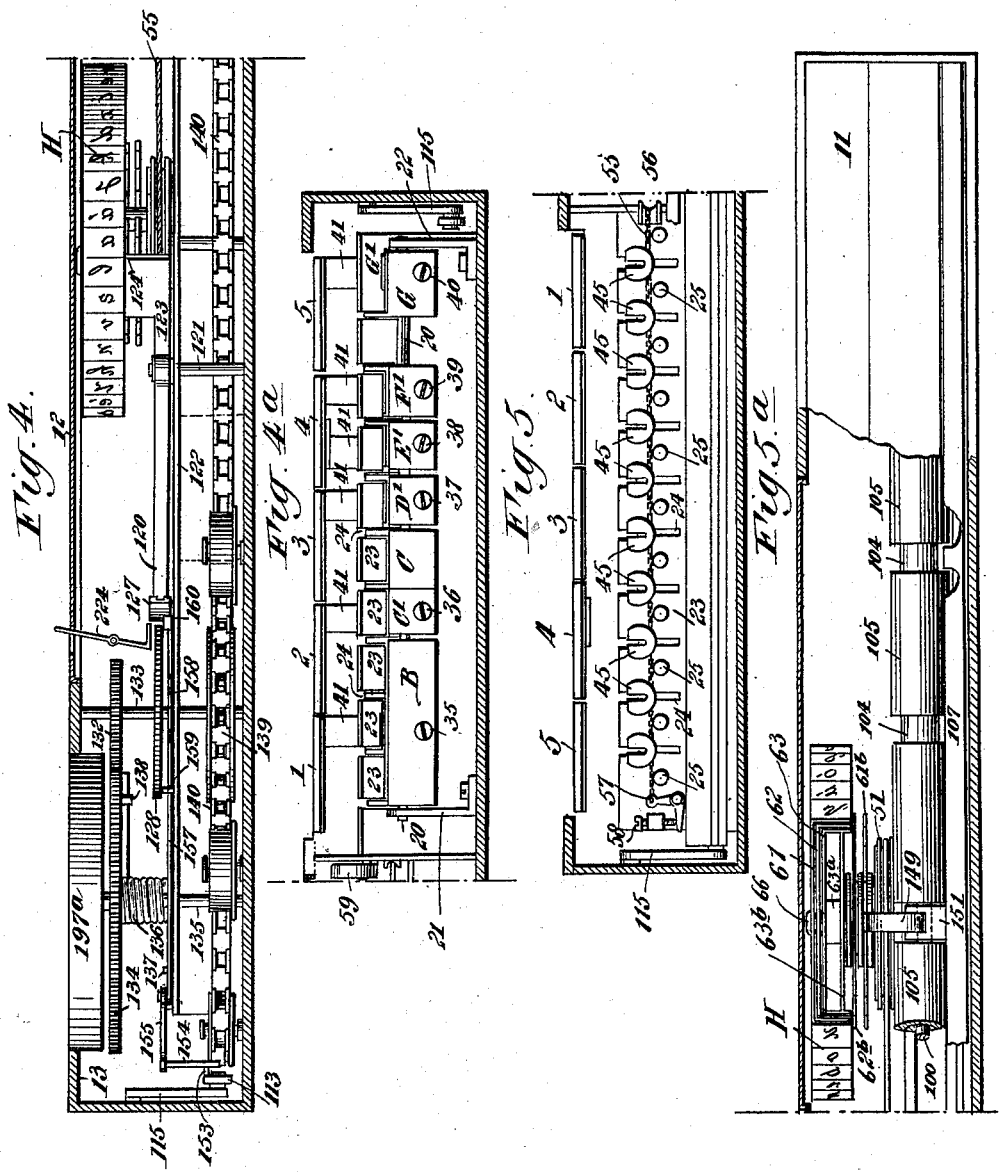

No. 638,092. Patented Nov. 28, 1899.
M. S. CARMONA.
TYPE WRITING MACHINE.
(Application filed Feb. 4, 1898.)
(No Model.) 7 Sheets—Sheet 3.
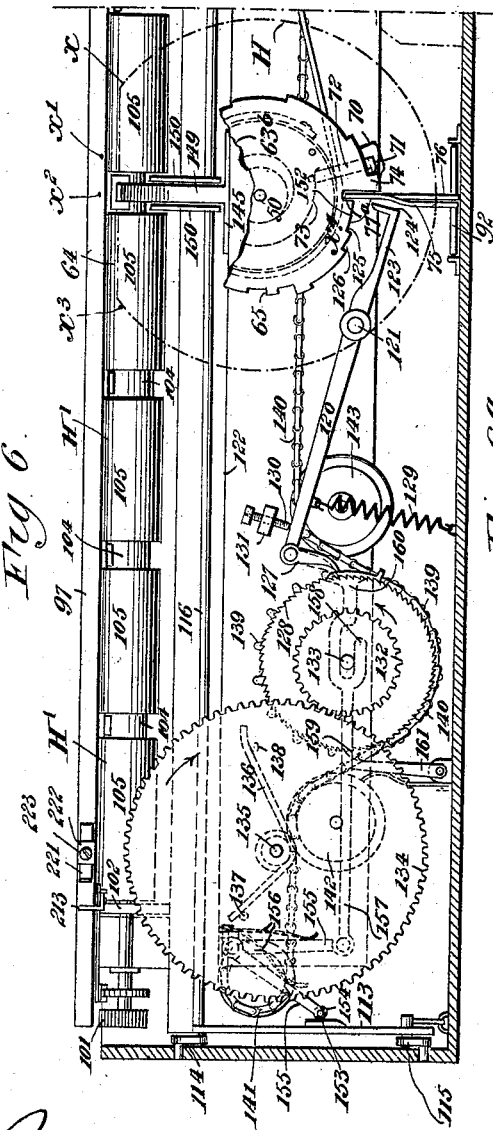
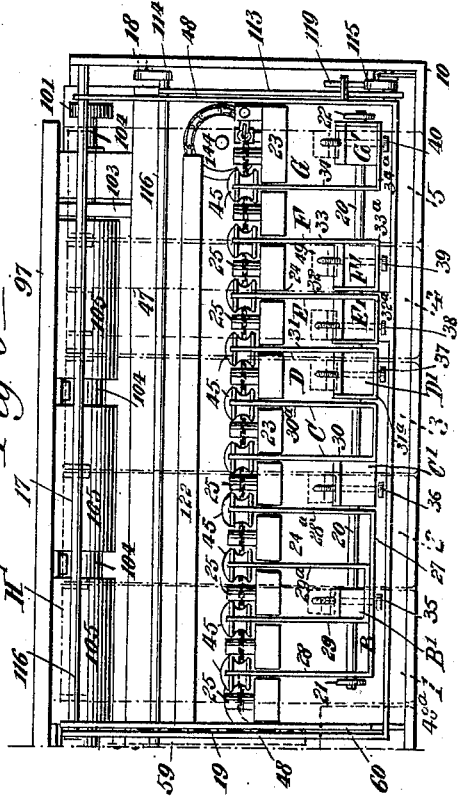

No. 638,092. Patented Nov. 28, 1899.
M. S. CARMONA.
TYPE WRITING MACHINE.
(Application filed Feb. 4, 1898.)
(No Model.) 7 Sheets—Sheet 4.

WITNESSES:
INVENTOR
M. S. Carmona,
BY
ATTORNEYS.

No. 638,092. Patented Nov. 28, 1899.
M. S. CARMONA.
TYPE WRITING MACHINE.
(Application filed Feb. 4, 1898.)
(No Model.) 7 Sheets—Sheet 5.
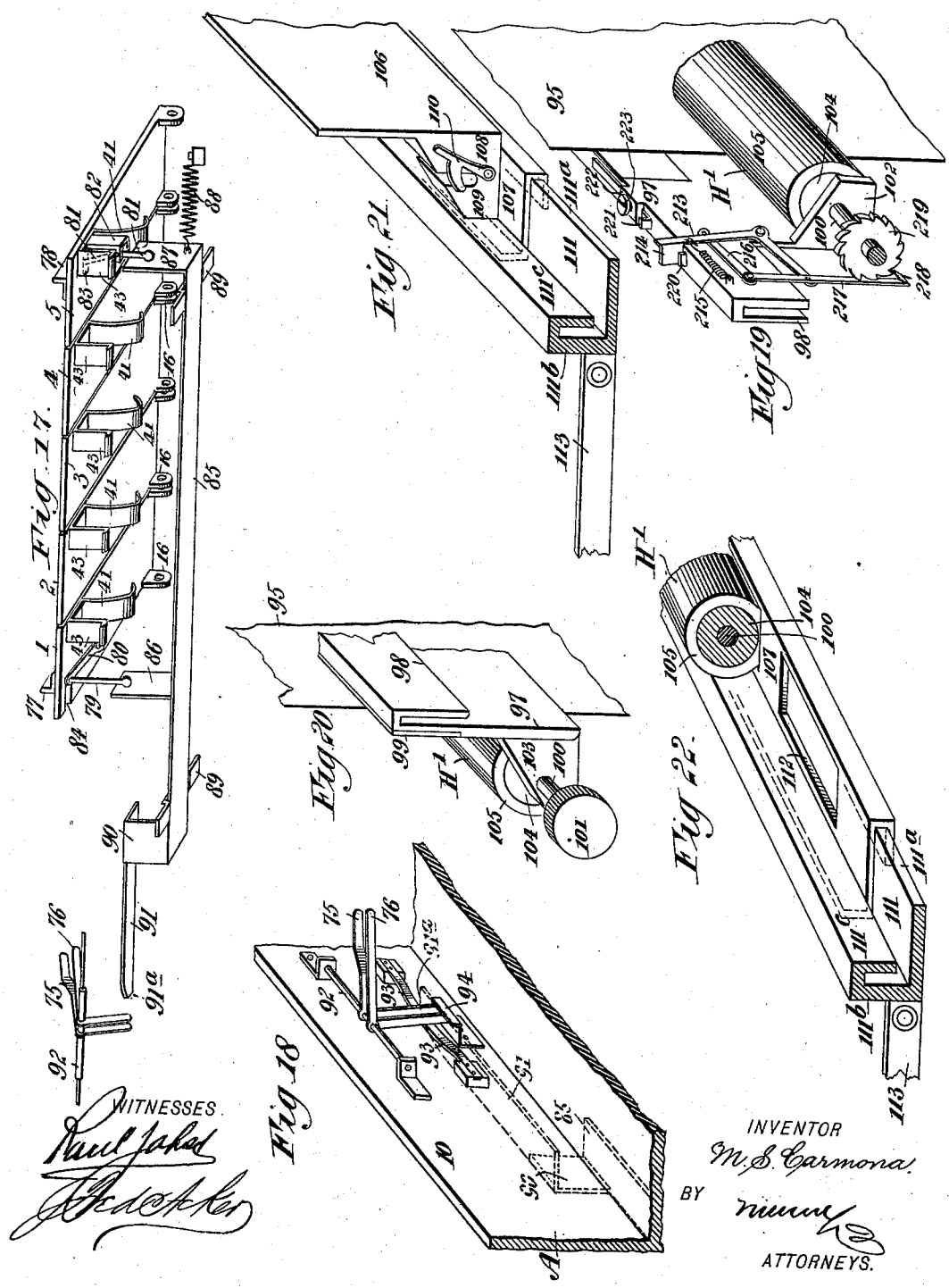
WITNESSES
INVENTOR
M. S. Carmona
BY
ATTORNEYS.

No. 638,092. Patented Nov. 28, 1899.
M. S. CARMONA.
TYPE WRITING MACHINE.
(Application filed Feb. 4, 1898.)
(No Model.) 7 Sheets—Sheet 6.
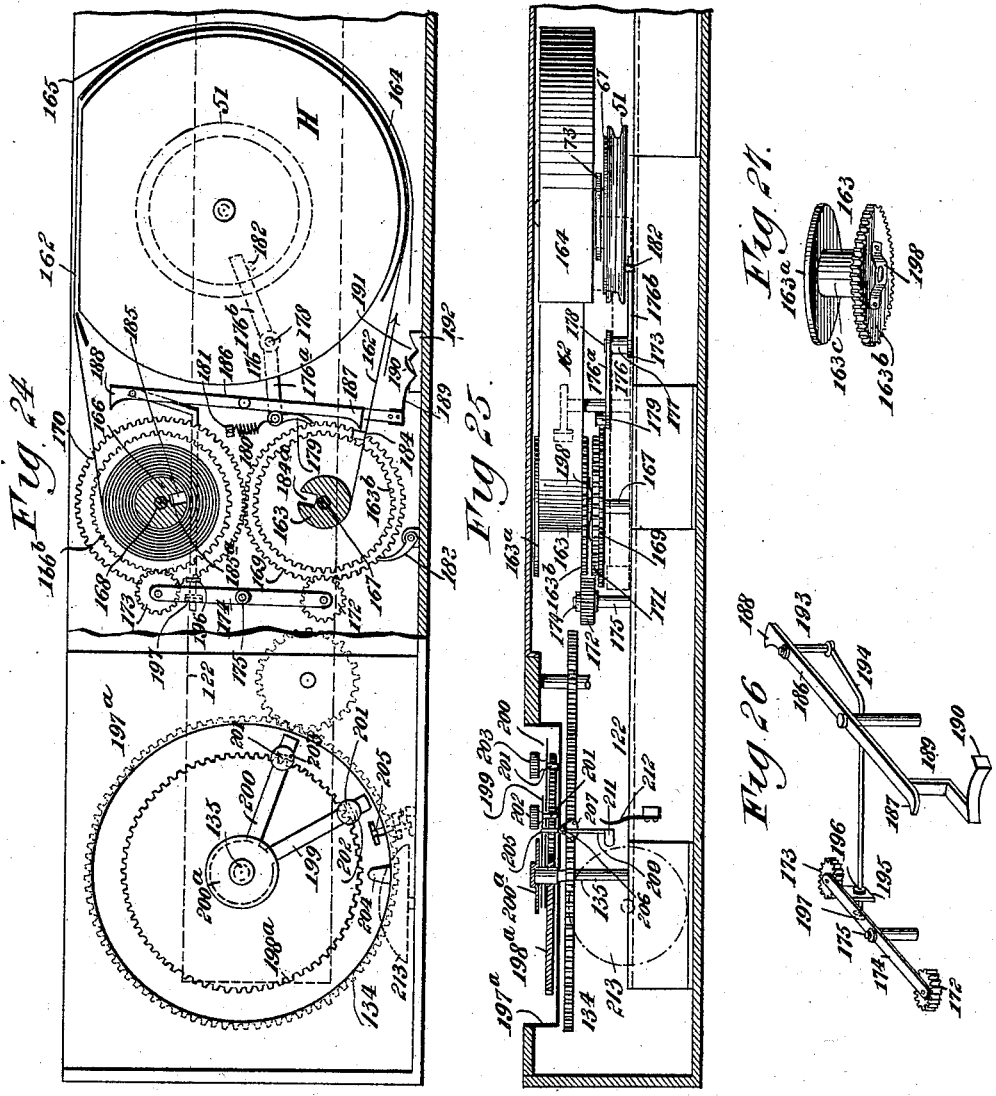
WITNESSES
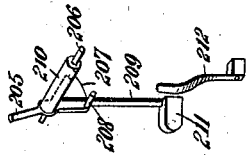
INVENTOR
M. S. Carmona
BY
ATTORNEYS.

No. 638,092. Patented Nov. 28, 1899.
M. S. CARMONA.
TYPE WRITING MACHINE.
(Application filed Feb. 4, 1898.)
(No Model.) 7 Sheets—Sheet 7.
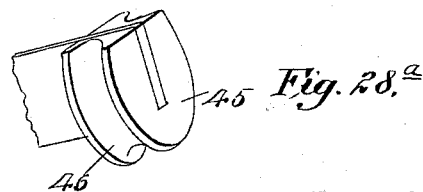
Fig. 28.ª
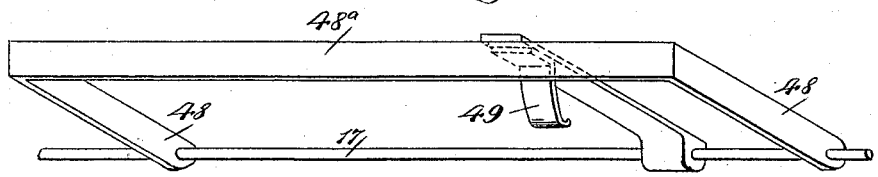
Fig. 29.
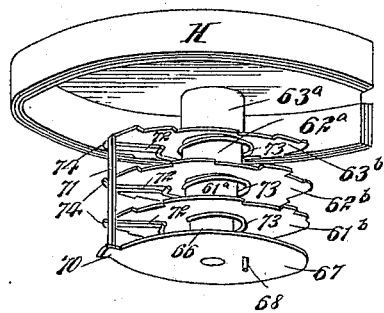
Fig. 30. Fig. 31.
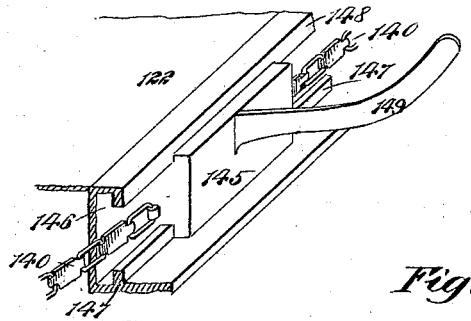
Fig. 33.
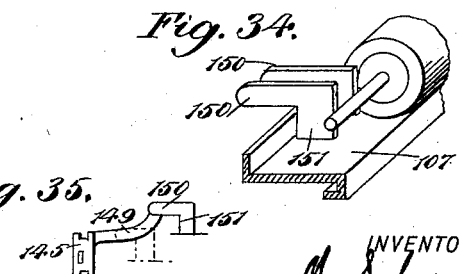
Fig. 32.
Fig. 34.
Fig. 35.
WITNESSES:
A. W. Walker
A. H. Davis
INVENTOR
M. S. Carmona
BY
Munn
ATTORNEYS
THE NORRIS PETERS CO., PHOTO-LITHO., WASHINGTON, D. C.

UNITED STATES PATENT OFFICE.

MANUEL S. CARMONA, OF MEXICO, MEXICO.

TYPE-WRITING MACHINE.

SPECIFICATION forming part of Letters Patent No. 638,092, dated November 28, 1899.

Application filed February 4, 1898. Serial No. 669,151. (No model.)

*To all whom it may concern:*

Be it known that I, MANUEL S. CARMONA, of the city of Mexico, Mexico, have invented a new and useful Improvement in Type-Writing Machines, of which the following is a full, clear, and exact description.

The principal object of this invention is to obtain with only five keys all the characters and signs usually employed in writing, the keys being limited to five, so that the writing can be accomplished by the use of but one hand.

A further object of the invention is to so construct the machine that in order to obtain a letter or a character it will be necessary only to press one key or several keys at the same time, thirty-one characters being obtained in this way, such being the number of combinations obtained with five keys.

A further object of the invention is to provide in addition to the five keys two auxiliary keys operated by the same hand operating the five keys, the auxiliary keys being arranged in such manner that they can be moved by a slight inclination of the fingers designed for operating the main keys to which such auxiliary keys correspond. In this manner thirty-one other characters can be obtained twice over, so that the total number of characters that can be obtained with the two auxiliary or lever keys in connection with the main keys will be ninety-three.

Another object of this invention is to provide mechanism by means of which the spacing of the type is measured automatically, so as to correspond to each letter to be printed, enabling the form and size of the type to be varied at will without inconvenience and whereby in the same machine large and small letters of English script, printing-letters, Gothic, German, Greek, and Russian, and other characters can be used.

Another object of the invention is to so construct the machine that the writing will be in sight and whereby even the last letter or character that has been written can be readily seen.

Another object of the invention is to so construct the machine that it will not be necessary to double the paper in any way. Consequently the machine can be used to write with equal facility on thick or on thin paper, postal cards, visiting-cards, or any other suitable substance, as well as celluloid, metallic plates, parchment, &c.

A further object of the invention is to construct a machine which will be exceedingly light and portable.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
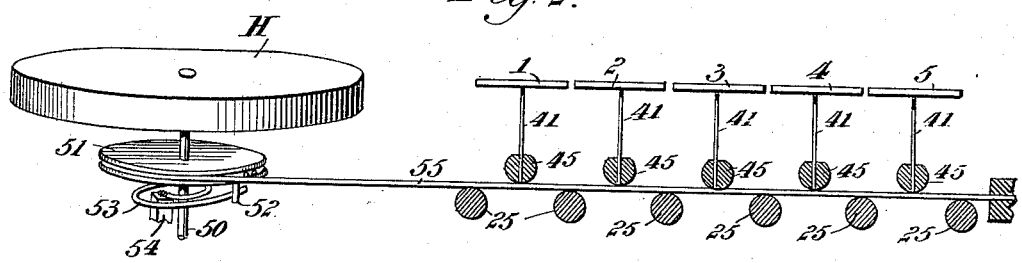
Figure 3:
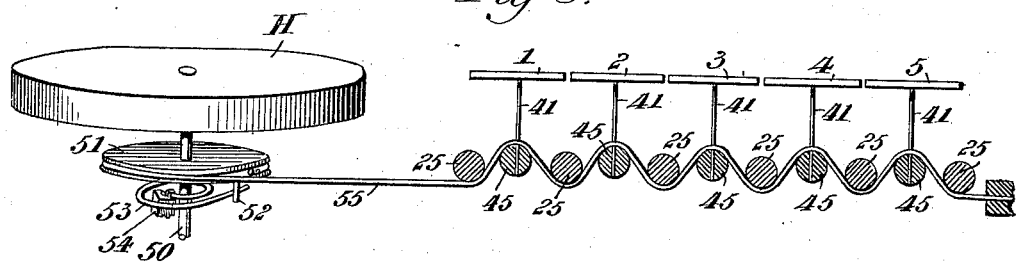
Figure 23:
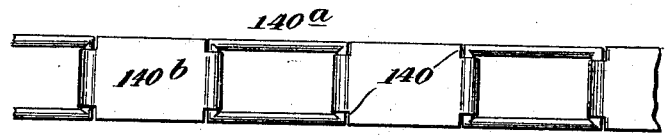
Figure 7:
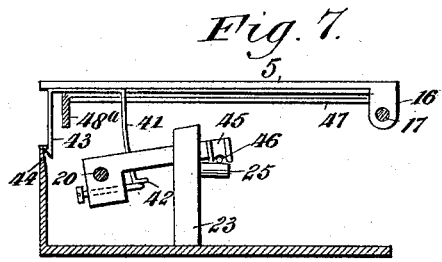
Figure 9:
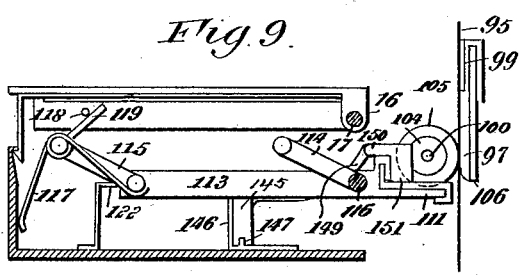
Figure 8:
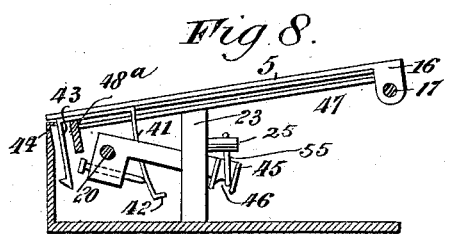
Figure 10:
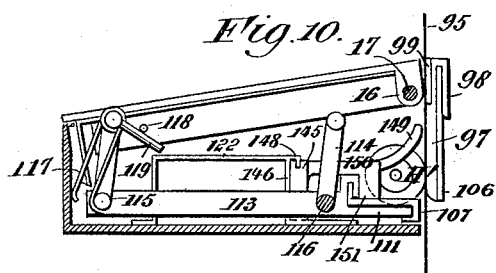
Figure 11:
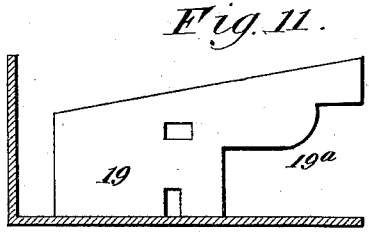
Figure 12:
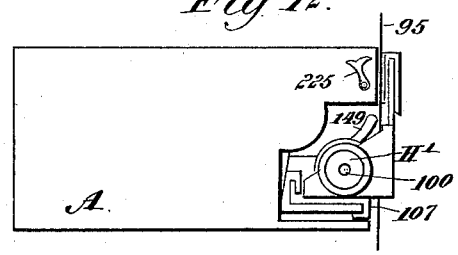
Figure 13:
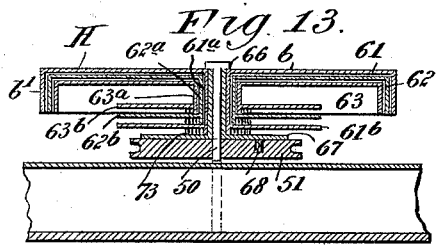
Figure 15:
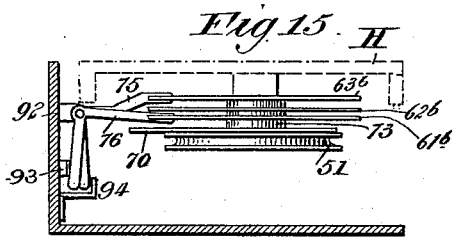
Figure 14:
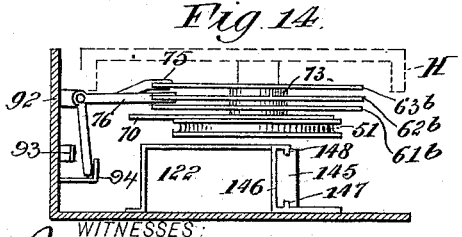
Figure 16:
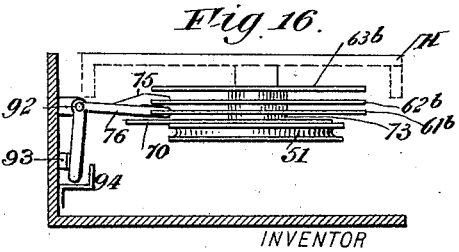

Figure 1 is a perspective view of the improved type-writing machine viewed from the front. Fig. 2 is a diagrammatic view illustrating the principle upon which the machine is constructed. Fig. 3 is a view similar to Fig. 2, illustrating a slight modification in carrying out the principle. Figs. 4 and $4^a$ represent vertical longitudinal sections through the machine, taken immediately at the rear of the front plate of the casing. Figs. 5 and $5^a$ are vertical longitudinal sections of the machine, taken immediately in front of the back plate of the casing, a portion of the back plate, however, remaining intact. Figs. 6 and $6^a$ are plan views of the machine, the top of the casing and the keys having been removed, the keys, however, appearing in dotted lines. Figs. 7 and 8 are transverse sections through the machine, illustrating, respectively, a key in normal position and in position to operate the type-wheels. Figs. 9 and 10 are transverse sections through the machine, illustrating the movement of the printing mechanism. Fig. 11 is a transverse section through the machine, illustrating in side elevation the partition which separates the key portion of the casing from that containing the other mechanism. Fig. 12 is an end view of the machine. Fig. 13 is a detail vertical section through the type-wheel. Figs. 14, 15, and 16 are transverse vertical sections through the machine, illustrating the manner in which the different zones of type carried by the type-wheel are controlled. Figs. 17 and 18 are detail perspective views of the mechanism employed for bringing into action, through the medium of the keys of the machine, any desired zone of type or characters carried by the type-wheel. Figs. 19, 20, 21, and 22 are perspective views of portions of the machine, showing particularly the manner in which the paper to be written upon is supported on the machine. Fig. 23 is a detail plan view of a portion of a chain used in the machine. Fig. 24 is a plan view of that portion of the machine containing the inking and alarm devices, parts being in horizontal section. Fig. 25 is a vertical longitudinal section through that portion of the machine in which the inking and alarm mechanisms are located. Figs. 26 and 27 are detail views of some of the parts of the inking devices, and Fig. 28 is a detail view of a portion of the alarm device. Fig. 28$^a$ is a detail perspective view of one of the knobs operated by a key. Fig. 29 is a detail perspective view of a frame and its trip-arm that are operated upon by all of the keys. Figs. 30, 31, and 32 are detail views of the type-wheel shaft and its post, disks, and springs; and Figs. 33, 34, and 35 are detail views of the paper-controlling mechanism.

The casing A of the machine, as shown in Fig. 1, is given rectangular shape, the front being designated as 10 and the back as 11, while at the central portion of the casing a top cover-section 12 is located, which is preferably hinged to the front in order that access may be readily obtained to the interior of the casing and especially to the type-wheel. At the left-hand end of the casing a fixed cover-section 13 is provided, in which a depression 14 is made, while at the right-hand upper portion of the casing five keys (designated, respectively, as 1, 2, 3, 4, and 5) are pivoted, the front 10 of the casing where the keys are placed being provided with a recess 15 in its upper edge, as is also clearly shown in Fig. 1. Each key is provided with one or more downwardly-extending lugs 16 at the rear end, as is shown particularly in Figs. 7 and 8, and the said lugs are pivotally mounted upon a shaft 17, extending longitudinally at the back of the machine from the right-hand end 18 of the casing to a partition 19, (shown in Figs. 11 and 6$^a$,) the partition 19 serving to divide the casing transversely at a point near the center and separate the key-compartment from the type-wheel compartment. The partition 19 does not extend to the front of the casing, and in the under rear portion of the said partition a recess 19$^a$ is formed, as is also clearly shown in Fig. 11.

A shaft 20 is located near the front of the machine within the key-compartment, the said shaft being journaled in suitable brackets or standards 21 and 22. At the rear of the shaft 20 and parallel therewith a guide-bar 23 is longitudinally secured in the said key-compartment, and in the said guide bar or board a series of slots 24 is produced, preferably equidistant apart. Upon the back of the guide bar or board 23, as shown in Figs. 5 and 6$^a$, a series of rollers 25 is located, one of them being between each two slots 24 and the end slots and the outer ends of the guide-bar.

Each key is adapted to operate a lever-frame. These frames are designated, respectively, as B, C, D, E, and G, and in addition to the frames above enumerated another lever-frame F is located beneath the keys, brought into action each time any of the keys is pressed downward, the other lever-frames being acted upon only when the key to which they respectively belong is brought into action. All the lever-frames are pivoted upon the shaft 20, and the lever-frame B for the key No. 1, as shown in Fig. 6$^a$, consists of a forward longitudinal member 27, two rearwardly-extending end members 28 and 28$^a$, and two intermediate rearwardly-extending members 29 and 29$^a$. These members or arms 28 and 28$^a$ and 29 and 29$^a$ extend through adjacent slots 24 in the guide-bar 23. The frame C belonging to key No. 2 comprises two rearwardly-extending arms or members 30 and 30$^a$, and the frame D belonging to key No. 3 comprises a rearwardly-extending member 31 and an angled front member 31$^a$. The frame E belonging to key No. 4 is of like construction, embodying a rearwardly-extending member 32 and a forwardly-extending member 32$^a$. The frame F, which is acted upon by all of the keys, also comprises a single rearwardly-extending member 33 and a front angled member 33$^a$, and the lever-frame G for key No. 5 comprises a single rearwardly-extending member 34 and a front member 34$^a$. Usually a block B' is secured to the lever-frame B at or near its front central portion, and a set-screw 35 is passed rearwardly through the frame and through the block. It will be observed that the lever-frame B extends under the key No. 2, as well as under the key No. 1, but is not acted upon by the key No. 2. The frame C for key No. 2 is at the right of said key, but is provided with a block or extension C', which is carried below key No. 2, and this block or extension is in its turn provided with a rearwardly-extending adjusting or contact screw or point 36. The frame D for key No. 4 is provided with a block D', secured in its front angle member 31$^a$, and this block or extension is provided with an adjustable set-screw or contact-point 37. The frame E has a block E' secured to its front angular member, and through this block an adjustable contact point or screw 38 is carried. The frame F is provided with a block F' and an adjustable contact-point 39, passed through the block, while the lever-frame G for the fifth key has a block G' attached thereto, fitted with an adjustable contact-point 40.

Each of the keys 1, 2, 3, 4, and 5 is provided with a downwardly and slightly-rearwardly curved trip-arm 41, terminating at its lower end in a rearwardly-extending foot 42, as shown in Figs. 7 and 8. The trip-arms 41 and the feet 42 therefore engage with the contact-points or adjusting-screws in the lever-frames belonging to the keys, and when a key is pressed downward, as shown in Fig. 8, it will depress the rear end of the rearwardly-extending arm belonging to the lever-frame operated upon, and after the arm or arms are depressed as far as necessary the trip-arms 41 will release themselves from the contact-points, as shown in Fig. 8. The lever-arms are adapted to act almost directly upon the type-wheel, and at the rear of each rearwardly-extending arm or member of a lever-frame a knob 45 is secured, the said knob, as shown in Figs. 7 and 8, being provided with a peripheral groove 46.

It may here be remarked that each of the keys is provided at its forward end with a spring-latch 43. These latches extend downward within the casing and are adapted when the keys are elevated or in their normal position to engage with keepers 44, as shown in Fig. 7, and thus limit the upward movement of the keys.

A frame 48 is provided for bringing the extra lever-frame F into action each time that a key is pressed downward. This frame, as shown best in Fig. 6$^a$, consists of a front bar 48$^a$, which extends below all the keys 1, 2, 3, 4, and 5, and side arms, which are pivoted upon the end portions of the rear shaft 17. A bar 47 is likewise pivoted on the shaft 17 and attached to the front member of the frame 48. This bar, which is shown in dotted lines in Fig. 6$^a$ and in positive lines in Figs. 7 and 8, is provided with a downwardly-extending trip-arm 49, (shown in dotted lines in Fig. 6$^a$,) the said trip-arm 49 corresponding to the trip-arms 41 of the key, and the trip-arm 49 is arranged to engage with the contact-point 39 of the auxiliary frame.

The type-wheel H is mounted to revolve upon the post 50, located at or about the central portion of the casing. (See Figs. 2, 3, 6, and 13.) A pulley 51 is mounted to turn loosely on the said post 50 below the type-wheel, the pulley being provided with a downwardly-extending pin 52, which is engaged by an end of a spring 53, the said spring being coiled around the post 50 and secured to a second post 54, independent of the pivotal post for the type-wheel. One end of a chain, rope, tape, or strap 55 is secured to the periphery of the pulley 51, the periphery of the pulley being grooved, so that the said chain, rope, or tape may be wound around the pulley to a certain extent. Motion is imparted to the type-wheel from the keys through the medium of the aforesaid rope, chain, or tape, which is passed over the rollers 25 on the guide-bar 23, and upon which rope, chain, or tape the knobs of the lever-frames normally rest, as shown in the diagrammatic view, Fig. 2, or, as illustrated in Fig. 3, the "chain" 55, as it will be hereinafter termed, may be passed under the rollers and over the said knobs, in which latter event, when a key descends, the chain is extended a certain distance instead of being contracted, as shown in Fig. 2.

The chain 55 after leaving the pulley 51 is passed over a guide-roller 56, located at the left-hand end of the guide-bar 23, and the chain after having been passed to an engagement with the knobs of all of the lever-frames is secured to a member of an angle-lever 57, pivoted at the right-hand end of the guide-bar 23, as shown in Fig. 5, the other member of the said lever being engaged by an adjusting-screw 58. In this manner the initial position of the chain may be graduated, and the movement of the lever-frames may be regulated at any time by adjusting the contact-points carried by the frames.

It is evident by reference to Fig. 2 that whenever the knob-carrying end of a lever-frame is pressed downward, which is caused when a key is compressed, the chain 55 will be pressed downward between adjacent supporting-rollers, and the pulley 51 will be made to turn.

The type-wheel H is shown particularly in Figs. 4, 5$^a$, 6, and 13, and really consists of three wheels 61, 62, and 63, placed one within the other, each of which is formed of a disk $b$, to the circumference of which a cylindrical zone $b'$ is attached, and on the zones of the type-wheel sections the letters or characters that are to be printed from are placed; but the three disks and their zones are cut by a vertical plane, presenting an opening 64, which will be the back portion of the wheel when the wheel is in its initial position, and as all of the sections of the type-wheel operate independently and no two at one time there will always be an opening at the back of the type-wheel, and at this point the impression is taken. The three zones of the type-wheel are so arranged that the small letters are on the outside wheel 61, the larger letters on the intermediate one 62, and the signs and characters are on the interior wheel 63. The axes of these sections of the type-wheel are formed of tubes, (designated as 61$^a$, 62$^a$, and 63$^a$,) one being within the other, as shown in Fig. 13, and at the lower ends of the said tubes disks 61$^a$, 62$^b$, and 63$^b$ are respectively placed, having recesses or grooves 65 in their circumference, the object of which will be seen later. A central tube 66 supports all of the other tubes, the said central tube being loosely mounted upon the post 50, and the tubes carried by the central tube are all free to revolve. A disk 67 is secured to the bottom portion of the central tube 66, and this disk is placed in engagement with the upper face of the pulley 51. When the type-wheel is mounted on the vertical axis 50, a finger or a pin 68 is made to pass through an aperture in the pulley 51, as shown in Fig. 13. Consequently the movement of the disk 67 and that of the pulley 51 are dependent one on the other. In the circumference of the disk 67 a lateral extension 70 is formed, and a post 71 is carried upward from the extension along the peripheral surface of all the disks 61$^b$, 62$^b$, and 63$^b$, the post being provided with three horizontal fingers or projections 72, each of the said projections or fingers being passed below each of the disks $61^b$, $62^b$, and $63^b$, while coiled springs 73 are secured to the ends of each finger 72, the said springs being carried around the tubes and post 50 and secured at their opposite ends, respectively, to the lower ends of the tubes $61^a$, $62^a$, and $63^a$. These springs 73 contribute, with the spring 53 below the pulley 51, (see Figs. 2, 3, 30, and 32,) to restore the type-wheel to its initial position after a key has been released, and the type-wheel is prevented from passing its initial position by projections 74, longer than the other projections on the periphery of the disks $61^b$, $62^b$, and $63^b$, striking against the upright post 71, carried by the lower disk 67, as shown in Figs. 6, 30, 31, and 32. Upon each zone of the type-wheel H type are arranged, and each zone presents a different character of type, either capitals, small letters, characters, figures, or type for punctuation. The knobs 45 of the various lever-frames are arranged in such manner that when the key 5, for example, is pressed down the type-wheel will advance one space only, consequently placing the first letter on the type-wheel opposite the paper. When key 4 is moved, the pulley and type-wheel are caused to turn a distance which will carry the type-wheel two spaces. When the key 3 is pressed downward, the type-wheel will be revolved a distance equivalent to four spaces. When the key 2 is operated, the type-wheel will be turned a distance corresponding to eight spaces, while when the key 1 is operated the type-wheel will turn a distance corresponding to sixteen spaces. These movements being arranged in the manner described, it is easy to see that the different movements corresponding to thirty-one combinations that can be made with five keys are precisely the thirty-one positions of the type-wheel for presenting each one of the type in front of the paper. The effect of each combination is obtained by adding the partial effects produced by each one of the keys touched. For example, the letter or sign located in the twelfth space of the type-wheel corresponds to the combination "2 3," because key No. 2 causes the chain 55 to move the type-wheel the distance of about eight spaces, and key No. 3 will cause the movement of the type-wheel for about four spaces. The letter in the twenty-first space will in the same manner correspond to the combination "1 3 5," because the key 1 when struck will bring about a movement of the type-wheel corresponding to sixteen spaces, the key 3 four spaces, and the key 5 one space, and as all three keys are struck together the type-wheel will have revolved the necessary twenty-one spaces. By reference to Figs. 4, 5, and 6 it will be observed that in the practical application of this principle it has been necessary to increase the number of knobs 45 in some of the frames operated by some of the keys, because some of the keys must bear over a considerable extent of the chain 55 to produce a movement of the type-wheel corresponding to sixteen spaces. For this purpose it will be seen in Fig. $6^a$ that for the key 1 four knobs 45 are provided on the frame-lever for said key, which knobs are firmly united, and as each of the knobs is so placed as to produce on the chain 55 an effect corresponding to a change in position of the type-wheel to the extent of four spaces the combined effect upon the type-wheel of the four knobs thus connected will be to revolve the same a distance corresponding to sixteen spaces with only a vertical movement corresponding to four spaces. In the same manner the lever-frame for key 2 is provided with but two knobs, each producing when brought into operation upon the frame a revolution of the wheel corresponding to four spaces, making the total revolutions of the wheel obtained by the use of key 2 a distance corresponding to eight spaces. For key 3 one knob on a lever-frame is sufficient, and its action will bring about a revolution of the type-wheel a distance corresponding to four spaces. Only one knob is provided for the lever-frame corresponding to key 4; but the said knob, by reason of its position on the chain, when brought into action will move the type-wheel a distance of two spaces only, while the lever-frame for key 5, although provided with but a single-knob 45, when said knob is brought into action will cause the chain to act upon the type-wheel and move the latter the distance of one space only by reason of the particular position of this knob on the chain. The effect of the action of the auxiliary frame-lever, which is brought into action each time a key is pressed, is to cause the type-wheel to advance until its first letter, which is at the position marked X in Fig. 6, is at the distance of one space from the point of impression marked $X^2$. Now since the auxiliary lever-frame F moves whenever one or more of the keys are touched the effect that it produces is to cause the spaces produced by the movement of the keys to be counted from the point marked $X'$, which is between the initial point X and the impression-point $X^2$, or, what amounts to the same thing, the effect of the auxiliary lever-frame is to add to that of each one of the thirty-one combinations referred to. For example, when key 5 is struck the contact points or pieces for the chain on this lever-frame will descend and add its effect to that produced by the auxiliary frame $F'$, and the two lever-frames also add their effect, whereupon the first letter situated at the point X will reach the intermediate point $X'$, and by means of the action of the lever-frame belonging to the key 5 the type-wheel will be carried one space farther, consequently meeting the point of impression $X^2$. If we strike the key 2, the movement of the auxiliary lever-frame F will cause the first letter at the point X to reach the point X', as in the previous case, and by means of the operation of the frame C belonging to key 2 the type-wheel, as has been heretofore pointed out, will turn the distance of eight spaces more, bringing the proper letter to the point of impression.

A strong spring 59 is attached to the partition 19 and is given bearing against the under face of the frame 48, acting upon the auxiliary motion-lever, since all of the levers acted upon directly by the keys may be termed "motion-levers" for the type-wheel. The said spring 59 acts to return the frame 48 and the keys to their normal position after having been relieved from pressure.

Attention is here called to the fact that the keys which are not struck remain in their initial position by the tension of the actuating chain, tape, or rope 55, but, if desired, their position may be made more secure by placing spiral springs on the shaft 17. A small auxiliary key 60 (shown in Figs. 1 and 6$^a$) is mounted upon the frame 58, used when spaces are to be marked, for, as we have seen, the said frame 48 only causes the type-wheel to advance so as to place the first type at the point X' removed the distance of one space from the printing position or the place of impression.

Two angle lock-levers 75 and 76 are provided for the disks 61$^b$, 62$^b$, and 63$^b$, the levers being placed side by side, and the horizontal member of the left-hand lever is curved at its rear end, whereas the horizontal member of the right-hand lever is straight throughout, and one lever stands slightly lower than the other. These levers are fulcrumed where their members connect on a shaft 92, located at the front central portion of the casing, as shown in Figs. 6 and 18, and are adapted to enter deep slots 77$^a$, made in the disks adjacent to the projections 74, as also shown in Fig. 6. The levers are held in their initial or normal position by springs 93, attached to the casing, bearing against the rear portions of the vertical members of the levers, as shown in Fig. 18, and the lower members of the levers are limited in their rearward movement by a stop 94. The positions of the lock-levers are controlled by placing two slides 77 and 78 upon the upper faces, respectively, of the key No. 1 and the key No. 5. These slides are preferably provided with flanges, so that they can be readily operated by the finger adapted to operate the key carrying the slide. The slide 77, which is the left-hand slide, (see Fig. 17,) is attached to a downwardly-extended arm 79, which arm 79 is attached to a horizontal arm 80, the latter being pivoted upon the under face of the key 1. An angle-lever 81 is attached to the right-hand slide 78, the said lever 81 being pivoted, preferably, to a projection 82, extending downward from the key 5. A slot 83 is made in the key 5 to permit the movement of the lever 81, and a corresponding slot 84 is made in the key 1 to permit of the movement of the arm 79. The arms 79 and 81 are free at their lower ends.

A plate 85 is mounted to slide in keepers 89, secured to the bottom of the casing A at the front. The right-hand end of the plate 85 is carried upward to form a projection 87, against the right-hand face of which the lower end of the lever 81 has bearing, and between the center of the plate 85 and its left-hand end a second projection 86 is formed, against the right-hand face of which the lower end of the arm 79 has bearing. The plate 85 is held in initial position or so that the slides 77 and 78 will be as near as possible to the center of the keys to which they belong by a spring 88, attached to its right-hand end and to an adjacent fixed support, as shown in Fig. 17. A third projection 90 is carried up from the left-hand end of the plate 85, which is mounted to slide, the said end projection 90 being opposite the central portion of the machine, and an arm 91 is attached to the upright 90 of the plate 85, and the free end of the arm 91 is provided with a beveled surface 91$^a$, since in the movement of the plate 85 brought about by the slides 77 and 78 the beveled surface of the arm 91 will be brought in engagement with the lower members of the lock-levers 75 and 76.

As stated, the lock-levers 75 and 76, which act to stop the disks 61$^b$, 62$^b$, and 53$^b$, have the form of angle-levers. When the extension-arm 91 moves horizontally, it first strikes on the lower arm of the lock-lever 75, causing the upper end of the said lever to pass from the intermediate disk on which it was placed in its initial position (shown in Fig. 14) to the lower disk. (See Fig. 15.) Under such conditions when the slide 77 has been moved the intermediate disk, or rather the zone carrying capital letters, will be free. When the slide 78 is moved, the trip-plate 85, and consequently the beveled surface 91$^a$ of the extension from said plate, will be advanced a greater distance and will contact with the pendent member of the lock-lever 76, which lever corresponds to the upper disk, and the horizontal member of said lever will descend until it reaches the intermediate disk, (see Fig. 16,) and only the upper disk or that bearing the signs will remain free.

In Fig. 18 it will be seen that the lock-levers 75 and 76 are mounted on the shaft 92, secured to the frame of the machine, and that the initial position of the levers is determined by the two springs 93 and the bracket 94, which serves as a stop. Before proceeding attention is called to the fact that the grooves 77$^a$ being as stated, the deepest grooves in the disks (see Fig. 6) no inconvenience will be caused if the pressure of the finger on the slides 77 and 78 be lessened after having touched one of said slides, for although the trip-plate 85 should return toward the right, leaving the elbow or lock levers 75 and 76 free, these levers could not return to their initial position, being prevented from so doing by the disks 61$^b$, 62$^b$, and 63$^b$, and these disks will return to their initial position only when the grooves 77$^b$ are freed from their respective lock-levers.

The paper or other material 95 on which it is intended to write (see Figs. 9, 10, 12, and 20) is held in position between a cylinder H' and a metal impression-plate 97, which impression-plate 97 is preferably polished and is provided at its front upper portion with a horizontal band 99 of an elastic material, and the said band serves as a cushion for the paper when an impression is to be made thereon. The upper edge of the impression-plate 97 is returned upon itself—that it, it is carried horizontally rearward and then vertically downward—forming a rear return member 98, as shown in Fig. 20. The cylinder H' is mounted upon a horizontal shaft 100, by means of which it can be made to revolve by buttons 101, located at the ends of the shaft, the shaft being supported in plates or brackets 102 103, formed at the ends of the impression-plate, as shown in Figs. 19 and 20. The cylinder preferably consists of a body 104, made of wood or of other hard material, and upon this body at intervals a covering 105 of caoutchouc or other equivalent substance is formed, producing enlargements of the cylinder at predetermined intervals in its length. All this portion of the mechanism—namely, the cylinder H', the impression-plate 97, and the attached parts, the two ends of which impression-plate are shown in Figs. 19 and 20—can be easily placed in the machine or removed therefrom, for which purpose the return-section 98 of said impression-plate is provided. The impression-plate is mounted upon a supporting-plate 106, which supporting-plate enters the space between the back of the impression-plate and its return member 98, as shown in Figs. 9, 10, 12, and 21. The supporting-plate 106 is in its turn mounted upon a carrying-plate 107, wings or brackets 108, extending forwardly from the base of the supporting-plate, being connected with the carrying-plate, and the carrying-plate in cross-section or end view resembles the letter Z, as illustrated in Figs. 10 and 12. Each bracket or wing 108 is provided with a groove 109, adapted to receive the shaft 100 of the cylinder H', the said shaft 100 being held in place by means of hooks 110 or their equivalents, as illustrated particularly in Fig. 21, so that when the impression-plate 97 has once been mounted on the supporting-plate 106 and the hooks 110 have been closed the cylinder H' and the impression-plate 97, and consequently the paper 95, will follow the movement of the carrying-plate 107, which is mounted to slide. The carrying-plate 107 is capable of moving to the right or to the left upon a bed-plate 111, the said bed-plate being so constructed as to comprise a horizontal rearwardly-extending member 111$^a$, an upwardly-extending member 111$^b$ at its front, and a downwardly-extending rear member 111$^c$, a space intervening the downwardly-extending rear or return member and the upper upright member 111$^b$, as shown in Fig. 21, and the upwardly-extending forward member of the carrying-plate enters the space between the return member 111$^c$ and the front member 111$^b$ of the bed-plate, while the rear return member of the carrying-plate is carried below the rearwardly-extending member 111$^a$ of the bed-plate, as shown in Figs. 10 and 12. The special form of the bed-plate will not permit the carrying-plate 107 to have more movement than is necessary to have the paper advance properly as it is written upon, which movement will be hereinafter fully explained when reference is had to the spacer.

Attention is here called to the fact that in order to give the cylinder H' the largest possible diameter, as heretofore described, it is represented as divided into sections of large diameter, alternating with sections of lesser diameter, and as the sections of larger diameter are those that hold the paper and serve to produce the spaces between the lines if the upper surface of the carrying-plate were solid the larger sections of the cylinder would strike the said carrying-plate 107. Therefore it has been necessary to provide the upper surface of the carrying-plate 107 with recesses 112, in which the larger sections of the cylinder H' may freely turn, as shown in Fig. 22. Such construction, however, is not absolutely necessary and can be avoided by slightly diminishing the dimensions of the larger portions of the cylinder H' or by making the distance between the shaft of the cylinder and the carrying-plate 107 greater.

In Figs. 6, 9, and 10 I have illustrated how an impression is made with a type. The bed-plate 111 is provided at each end with an arm 113. These arms are carried in direction of the front of the casing, and the arms 113 are pivotally supported by two pairs of angle-arms of the link type—a rear pair 114 and a forward pair 115—the upper ends of the link-arms being pivoted in any approved manner to the end portions of the casing. In order to impart strength to the bed and the parts sustained thereby, the lower ends of the link-arms 114 are connected by a shaft or a rod 116, which passes from one side of the machine to the other. A strong spiral spring 117 is coiled around the pivotal connection between the forward link-arms and the casing, as shown in Figs. 9 and 10, and the said springs are made to extend downward at their forward ends to an engagement with the front of the casing, while their rear ends are curved and carried to an engagement with the pivotal connection between the forward link-arms 115 and the side arms 113 of the bed-plate. These springs serve to keep the link-arms 114 and 115 and all parts dependent on them in their initial position, as shown in Fig. 9. Now let it be supposed that one or several of the keys have been touched, as has been described. Besides the key or keys touched the frame 48, arranged below the keys, will descend with them, and this frame is provided at its right-hand side with a button 118, which button is adapted for engagement with the arm 119, projected from the upper pivotal portion of the right-hand link-arm 115. Therefore when a key is pressed downward, carrying with it the frame 48, the said frame by means of its button 118 will act upon the arm 119 and will cause the bed-plate and its forwardly-projecting arms 113, the cylinder H', the paper 95, and all parts in this combination to descend, describe in descending the arc of a circle, and take the position represented in Fig. 10. Consequently the type that corresponds to the combination of keys struck and which places itself at the point of impression in the first part of the movement of the keys will make an impression on the paper. When the fingers are raised from the keys and the latter are returned to their initial position, the paper moves back, following in the opposite direction the arc of the circle which it followed in its forward movement until it again reaches the position shown in Fig. 9, leaving in plain sight the impression of the type that has been made.

The spacer (shown particularly in Figs. 4 and 6) is formed by a horizontal lever 120, mounted on a vertical shaft 121. The lower part of this shaft rests upon the base of the machine and extends upward above a horizontal plate 122, which is of angular construction, one member of the plate extending downward to the bottom of the machine, and the said plate 122 extends nearly from one end of the casing to the other, being reduced in width at the top from a point near the partition 19 to the left-hand end to give room for the mechanism at the left of said partition 19. The lever 120 is provided with an arm 123, which extends from the shaft 121 in direction of the type-wheel, and the said arm is provided in its turn with a head 124, angular in cross-section, the rearwardly-extending member of the head being more or less sharp. The head 124 of the lever 120 is adapted when the lever moves to enter the recesses 65 of the disks 61$^b$, 62$^b$, or 63$^b$ which has been moved, but particularly enters a recess 125 in one of the said disks, which recess is shown in Fig. 6 and corresponds to the initial position of the type. The recess 125 is deeper than all the other recesses in the disks except the recesses 77$^a$, which latter recesses can never pass in front of the lever, for, as shown in Fig. 6, the maximum movement of the type-wheel—that is to say, the movement for making the impression of the last letter placed at the point X$^3$ in Fig. 6—is less than the complete revolution, so that the position corresponding in its maximum movement to the grooves 77$^a$ will be the point marked X$^4$. The recesses 65 and 125 of each of the disks 61$^b$, 62$^b$ and 63$^b$ are so formed that for each letter printed the distance between the head 124 of the lever 120 and the bottom of the said recesses is exactly equal to half the width of the type making the impression, so that when the lever-arm 123 passes over this distance the left-hand end of the lever will pass over a distance equal to the width of the type, because the left-hand or main portion of the lever is double the length of the extension or right-hand portion.

In Fig. 6 it will be observed that close to the recess 125 of the type-wheel disk corresponding to the first letter on the type-wheel a second recess 126 is produced. This second recess serves for measuring the width corresponding to a space, since, as shown in Fig. 6, and remembering what has been said in regard to the auxiliary spacing-key 60, the recess 126 remains in front of the rearwardly-extending portion of the head 124 of the lever 120 when the auxiliary or spacing key 60 is struck. It is necessary to vary the width of the spaces according to the class and size of type to be used, and, as will be observed, each type-wheel will mark its spaces not according to the general size of type used, but will mark the spaces for capitals, small letters, and signs. At the right-hand end of the lever 120 a horizontal pawl 127 is pivoted, the said pawl being held in engagement with the teeth of a finely-toothed wheel 128, mounted upon a fixed shaft 133, the pawl being held in engagement with the said wheel by means of a spring 129, (shown particularly in Fig. 6,) and the rearward movement of the lever 120 is limited by contact with a screw 130, which serves to regulate the initial position of the said lever, the said screw being mounted in a post 131, secured to the horizontal plate 122. The ratchet-wheel 128 is caused to move in direction of the arrow marked upon it through the medium of a pinion 132, mounted on the same shaft 133, which pinion meshes with a large wheel 134, mounted upon a shaft 135 nearer the left-hand end of the casing. A strong spiral spring 136 is coiled around the shaft 135, the ends of which spring are made to engage one with a stop-pin 137, secured upon the horizontal plate 122, and the other with a stop-pin 138, secured to the large wheel 134, as shown in Fig. 4. Consequently this spring serves to cause the wheel 134 to revolve in the direction of the arrow shown in Fig. 6. A spur or chain wheel 139 is mounted upon the lower portion of the shaft 133, the teeth whereof mesh with the open links of a chain 140, as shown in Figs. 4 and 6. The chain is illustrated in detail in Fig. 23, and consists of open links 140$^a$ and closed links 140$^b$, alternately arranged and pivotally connected. This chain extends the entire length of the machine, being guided by pulleys 141, 142, 143, and 144, as shown in Figs. 6 and 6$^a$. The two ends of the chain are fixed to the slide 145, (shown in Figs. 6, 9, and 10,) the said slide being adapted to travel the length of a vertical plate 146, which plate is attached to the forward end portion of the upper angle-plate 122, being provided with a rib 147 at its bottom and a socket 148 at the top to receive the said slide 145. A finger 149 is attached to the slide, which finger, as shown in Figs. 6, 9, and 10, is given an upward and rearward inclination. This finger is embraced by or is located between two projections 150, secured to uprights 151, the uprights being attached to the carrying-plate 107 of the paper-controlling mechanism. In the initial position of the spacing mechanism the power of the driving-spring 136 overcomes the resistance of the smaller spring 129, and consequently the lever 120, which will have its pawl 127 between the teeth of the wheel 128, as shown in dotted lines in Fig. 6, is inclined until it strikes the adjusting-screw 130, interrupting all movement of the wheels 128, 132, and 134. Let it be supposed that one or more keys are struck. As has been stated, the first thing to occur will be that the letter that corresponds to this combination will be placed at the point of impression, and consequently the recess 125 of the disk $61^b$, $62^b$, or $63^b$ which corresponds to that type will remain in front of the head 124 of the lever 120 for measuring the type. At this time a projection 152 on the lower disk 67 and located at the left of the projection 70 on the same disk will have moved back by reason of the angular movement necessary for placing the type at the point of impression. At the same time that the type reaches the point $X^2$ of impression the paper begins to descend, as has been heretofore described, in order that the type may make an impression upon it, being guided in this movement by the arms 114 and 115 of the paper-controlling mechanism, (see Figs. 6, 9, and 16,) all lateral movement being prevented by the projections 150 at each side of the slide-finger 149. A moment before the paper comes against the type an inclined-plane 153, placed on the interior face of the side arm 113 of the paper-controlling mechanism on the left-hand side of the machine, (see Fig. 6,) will strike a vertical rod 154 and will cause an elbow-lever 155, to which the rod is attached, to deviate from its course, the lever being pivoted upon the plate 122. The movement of this short lever 155 overcomes the resistance of a spring 156, bearing upon the lever, and causes the lever to move to the right, as shown in dotted lines in Fig. 6. This movement of the lever 155 will cause a rod 157 to move to the right also, the rod 157 being pivotally attached to the lever 155 and guided in its movement by the vertical shaft 133, as shown in Figs. 5 and 6, the rod being provided with a fork 158 to receive the said shaft. Two segmental extensions 159 and 160 are projected from the rod 157, as shown in Fig. 6, and the first segmental extension 159 is adapted to hold a spring-pressed pawl 161 raised and in position to rest upon the ratchet-wheel 128, as is also shown in Fig. 6, just before the second extension 160 raises the pawl 127. At this moment, which is the time that the impression is being made, the lever 120 and its attachments, being no longer detained either by the pawl 127 or the projection 152 from the disk 67, are caused to move by the action of the spring 129 until the head 124 of the lever encounters the groove corresponding to the type making the impression, as heretofore stated, the pawl 127 passing through a space equal to the width of the type making the impression. When the pressure of the key ceases, the movements just described are produced in inverse order. First, the paper begins to leave the type, a moment later the inclined plane 153 ceases to operate on the lever 155, and the latter, under the impulse of the spring 156, returns to its initial position, allowing the pawl 127 to engage the teeth of the wheel 128 and raise the pawl 161. At this moment the driving-spring 136 overcomes the spring 129, the wheels 128, 132, and 134 revolving through a certain segment of a circle in direction of the arrows shown in Fig. 6 until the lever strikes the stop-screw 130, and as the sprocket-wheel 139 turns the same distance through the medium of the chain 140 the sprocket-wheel transmits this movement to the slide 145 and finger 149, and consequently to the paper, which moves to the left a distance equal to the width of the type that has just made an impression. At the same time that this occurs all the other parts that have moved return to their initial position, as has been described, and the paper rises until the type-impression is in plain sight.

The inking mechanism is presented in detail in Figs. 24, 25, 26, and 27, but has not been shown in position in the figures in which it might have been shown lest these figures be made too complicated or obscure. The inking mechanism consists of an inking-ribbon 162, attached to a drum 163 and passed through guides 164, conveniently supported and arranged around the type-wheel H, until it reaches the opening 165 in the back of the casing, where the impression is made. Adjacent to this point the ribbon is wound upon a drum 166 of the same construction as the drum 163, above referred to. In Fig. 27 one of these drums is represented, the upper part $163^a$ of which is not shown in Fig. 24, being a simple disk, and the lower part $163^b$ being a toothed disk, the two parts being connected by a cylindrical post $163^c$. The plain disk of the drum 166 is not shown. The toothed disk of the said drum, however, is illustrated in Fig. 24, and is designated as $166^b$. These drums are mounted, respectively, on shafts 167 and 168, and these shafts are located on the horizontal plate 122. A horizontal gear 169 is mounted to turn on the shaft 167, and a second and similar gear 170 is secured upon the shaft 168, the two gears 169 and 170 meshing with each other, as shown in Fig. 24. An auxiliary gear 171 is secured upon the upper face of each gear 169 and 170, only one of which gears is shown in Fig. 25. These gears are of the same diameter and have the same number of teeth as the toothed wheels 163$^b$ and 166$^b$ of the two drums 163 and 166, the toothed wheels of the drums being placed directly over the said auxiliary gears 171. Pinions 172 and 173 are mounted, respectively, on the ends of a horizontal lever 174, which in turn is mounted upon a shaft 175, secured to the aforesaid horizontal plate 122. The pinions 172 and 173 are adapted to mesh alternately, the pinion 172 with the wheel 171 and the drum-wheel 163$^b$ on the shaft 167, the pinion 173 meshing with the other two similar wheels 171 and 166$^b$, carried by the shaft 168. The forward movement of the ribbon 162 is obtained by means of a lever 176, constructed with an upper section 176$^a$ and a lower section 176$^b$, the two sections being connected by a hub 177, mounted to turn on a post 178, located on the horizontal plate 122. The upper end of the lever is provided with a pawl 179, to which pawl a spring 180 is attached, the spring drawing in a rearwardly direction and being secured to the post 181, also attached to the plate 122. The free end of the lower member 176$^b$ of the lever 176 is adapted for engagement with a pin 182, projected downward from the under side of the pulley 51 of the type-wheel. The pawl 179 engages with the teeth of the wheel 169, mounted on the shaft 167, as shown in Fig. 24, and at the opposite side of the said wheel its teeth are engaged by a second pawl 183. The ribbon where it connects with the drum 163 is provided with a rearwardly-extending pin 184, adapted to enter an opening 184$^a$, made in the cylindrical section of the drum 163, and near the point where the said ribbon connects with the drum 166 a second pin 185 is secured, adapted to enter an opening 185$^a$ in the body portion of the drum 166, as is also shown in Fig. 24. A lever 186 is fulcrumed at or near its center upon the plate 122. At the forward end of this lever a projection 187 is formed, adapted to be engaged by the pin 184 on the ribbon, and a similar projection 188 is made at the opposite end of the lever, to be engaged by the pin 185 near the opposite end of the ribbon. At the forward end of the lever 186 a downwardly-extending angle-arm 189 is secured, being provided with a spring-tongue 190, which is at an angle to the lower or horizontal member of the arm 189, as is best shown in Fig. 6, the spring-tongue 190 being adapted to enter one of a series of recesses 191 or inclined planes produced in the inner edge of a block or keeper 192, secured to the inner face of the forward wall of the casing, as shown in Fig. 24. Near the rear end of the lever 186 a bar 193 is carried downward, the said bar carrying at its lower end a rod 194, and this rod is made to extend through an opening in a plate 195, extending downward from the lever 174, carrying the pinions 172 and 173, the plate 195 being near the pinion 173, and two collars 196 and 197 are formed upon the rod 194, one at each side of the plate, the rod moving the lever 174 whenever a collar is brought in engagement with the plate.

Let us suppose the mechanism to be arranged as shown in Fig. 24 and the impression of a letter is to be made. The pulley 51 on the type-wheel H will turn a certain distance, and consequently the pin 182 will move away from the lever 176, and this lever will be drawn rearward by the spring 180, the wheel 169 being held in the meantime by the pawl 183. When the type-wheel returns to its initial position, the stop-pin 182 returns the lever 176 to the position represented in the said Fig. 24 and causes the wheel 169 to advance slightly in direction of the arrow, while the wheel 170 will move in the opposite direction, since the two wheels are in mesh. Now by means of the pinion 173 the wheel 170 transmits movement to the ribbon-drum 166, connected with it, causing the ribbon to wind up on the said drum 166, while the drum 163 will keep the ribbon tight, as it tends to turn in the opposite direction, this action being caused by the spring 198, placed under the lower face of each drum and having frictional engagement with the wheel 171, placed immediately below the drum.

In Fig. 24 I have represented the parts as in the position they occupy at the moment in which the ribbon is about to wind on the drum 166 and to unwind from the drum 163. When one or two letters more make an impression, the pin 184 on the ribbon and located near the drum 163 will strike the forward end 187 of the lever 186, carrying the said lever with said pin until the spring-tongue 190 enters the recess in the keeper-block 192. When the spring-tongue reaches the keeper-block, it will stop the movement of the lever 186, and one of the collars on the rod 194, connected with said lever, will strike against the plate 195, projected from the pinion-carrying lever, and will cause the pinion 173 to disengage from the wheel of the drum 166, leaving the said drum free, and will cause the opposite pinion 172 to enter in engagement with the wheel of the drum 163 and transmit motion to the said drum, whereupon the ribbon will move in the opposite direction, winding on the drum 163 and unwinding from the drum 166 until when the ribbon has nearly unwound from the drum 166 the lever 186 will be returned by means of the ribbon-pin 185 striking the rear end of the lever 186, and the movement of the ribbon will then be in the opposite direction, the winding being alternately on one or the other of the drums and the shifting of the pinions being brought about by the collars 196 and 197 on the lever-rod 194 alternately operating the pinion-carrying lever. The ends of the ribbon secured to the ends of the drum should consist of a strong fabric one or two inches long, and the ends of the ribbon are secured to these pieces of fabric by means of pins or clamps.

I will here call attention to the fact that the ribbon-pins 184 and 185 need not be exactly in the first fold of the ribbon in order to enter their respective recesses 184$^a$ and 185$^a$, since the pins can be arranged in the second or third folds of the ribbon, holes being made in the ribbon, so that the first or second fold or winding of the ribbon around the drum will not cover the said recesses 184$^a$ and 185$^a$.

In Figs. 24, 25, and 28 and also in Figs. 4 and 6 are shown the parts that determine the length of the lines. Immediately over the large gear 134 at the left-hand end of the machine an opening is made in the top, in which a cylindrical casing 197$^a$ is entered, and upon the shaft 135 a toothed wheel 198$^a$ is mounted, being at the bottom portion of the shaft 135, which is carried up through the said cylindrical casing. Two diverging arms 199 and 200 are connected at their converging ends to a plate which is loosely mounted on the upper end of the shaft 135, being prevented from leaving the said shaft by a cap 200$^a$. The arm 200 serves for determining the beginning and the arm 199 the end of a line. Each arm 199 and 200 is provided with a downwardly-extending member 201, (shown in Fig. 25,) the said members being adapted to enter the spaces between the teeth in the wheel 198$^a$, and each arm 199 and 200 is provided with a knob, the said knobs being designated as 202 and 203, the knobs being adapted to facilitate moving said arms. A pin 204 is fixed to the casing and extends over the said cylinder, the said pin serving to limit the movement of the arms 199 and 200 in one direction. Between the arm 199 and the stop 204 the upper end of a lever 205 is placed in such manner that the arm 199 will strike the said lever when being carried to the stop 204. The lever 205 is fulcrumed upon a shaft 206, secured in the casing, and a segmental extension 207 is formed in the lower end of the lever, a pin 208 being provided at each side of the extension. An arm 209 is provided at its upper end with a hub 210, mounted to turn on the shaft 206, as shown in Fig. 28. The arm 209 extends downward between the pins of the extension of the lever and terminates at its lower end in a head 211. At the right-hand end of the head 211 a spring 212 is located, attached to any convenient support within the casing of the machine, and at the left of the head 211 a gong or a bell 213 is secured in the machine. Just before the arm 199 reaches the stop 204, as stated, the arm will strike the upper end of the lever 205 and in passing over the lever will incline its upper end to the left and move its lower extension 207 to the right, carrying with it the hammer-arm 209 and forcing the head or hammer 211 against the spring 212, and when the arm 199 has passed completely over the lever the spring 212 will act to force the hammer against the bell and give warning that the end of the line is reached.

The mechanism for making the space between the lines is shown in Figs. 6 and 19. An elbow-lever 213 is pivoted at one end of the impression-plate 97, the upper end of the lever extending above and over the top of the said plate, terminating in a head 214. The head 214 is normally held against a stop 220 by means of a spring 215. A link 216, parallel with the lower horizontal member of the elbow-lever, is likewise pivoted on the impression-plate, and a connecting-rod 217 is pivoted to the link and to the lower or horizontal member of the elbow-lever, the said connecting-rod extending downward and terminating in a hook 218, adapted for engagement with the ratchet-wheel 219, secured upon the shaft 100 of the feed-roller H′ for the paper. The movement of the head of the lever away from its stop 220 is limited by a second stop 221, which is in the form of an angle-plate, the angle-plate passing beneath a loop 222, formed on the top of the impression-plate, and the stop 221 is held in proper position by a set-screw 223 or its equivalent. It will be observed that the elbow-lever, link, and connecting rod or bar 217 form an articulated parallelogram. Whenever the head 214 of the elbow-lever is carried in direction of the right, the connecting-rod 217, provided with the hook 218, will be raised, and consequently the ratchet-wheel 219 will be turned and will rotate the feed-cylinder H′ sufficiently to advance the paper. As the connecting rod or bar 217 is made of an elastic material and the pressure of the cylinder H′ against the paper is comparatively strong, when the connecting-rod 217 descends it will have no action whatever on the cylinder. The adjustable stop 221, limiting the movement of the lever 214 to the right, also governs the spaces between the lines. The lever 213 is adapted to be operated by hand.

To place the paper in the machine, it is simply necessary to cause the cylinder H′ to turn by means of the buttons 101, secured to the cylinder-shaft at its ends, and to move the paper in order to write a new line it is only necessary to push the parts that hold the paper to the left by pressing on the head 214 of the lever 213, as described. When it is desired to move the paper from the right to the left to made a correction or for any other purpose, it is sufficient (see Fig. 4) to raise the pawl 127 of the lever 120, which action may be accomplished through the medium of a lever 224, fulcrumed at a suitable point within the casing, which lever extends out through the top of the casing, and the lower end of the casing is so formed that it may be carried beneath the pawl.

In conclusion it may be stated that one part of the cover of the machine may be raised, as shown in Fig. 1, in order to gain access to the type-wheel and inking device, and that if it be desirable to investigate the mechanism below the case it is simply necessary to press the spring-latches 43 inward, relieving them from contact with the keeper 44, whereupon the case may be raised. (See Figs. 7, 8, 9, and 10.) The initial position of the paper and the parts that support it is best shown in Fig. 9.

When the machine is to be transported, the paper-carrying mechanism is pushed downward, so as to be below the top surface of the casing and locked in its lower position by hooks 225, (shown in Fig. 12,) the mechanism then being in the position shown in Fig. 6.

Having thus described my invention, I claim as new and desire to secure by Letters Patent—

1. In a type-writer or a like machine, a movable type-carrier having a series of type located side by side, a flexible connection operatively connected with said type-carrier, so that a longitudinal movement of the said connection will produce a movement of the type-carrier to bring any one of the types into printing position, keys operating said flexible connection to exert a longitudinal pull thereon, and means for limiting the movement of the said flexible connection, said means being so arranged relatively to the respective keys that the movement of the flexible connection produced by the operation of the individual keys will be in the proportions indicated by a geometric progression with the constant ratio two.

2. In a type-writer or like machine, a movable type-carrier having a series of type located side by side, a flexible connection operatively connected with said type-carrier, so that a longitudinal movement of said connection will produce a movement of the type-carrier to bring any one of the types into printing position, keys operating said flexible connection to exert a longitudinal pull thereon, the individual keys acting differently on the flexible connection, and the movements of the said connection produced by the keys when operated singly being in the proportions indicated by a geometric progression with the constant ratio two.

3. In a type-writing or similar machine, the combination, with a movable type wheel or carrier, and a flexible strip connected with the wheel or carrier, being arranged to impart movement thereto, of a series of keys adapted to control the movement of the type-carrier, either singly or in combination, the extent of the movement of the type-carrier produced by the keys when used individually being in the proportions indicated by a geometric progression, levers operated by the keys, extended across and adapted for engagement with the strip, supports for the strip, between which supports the levers engage with the strip, and means for regulating the contact between the levers and the keys, substantially as described.

4. In a type-writing or similar machine, the combination, with a type-wheel, a strip of yielding material arranged to impart movement to the type-wheel, being connected therewith at one end, an adjustable support for the opposite end of the strip, and a series of keys arranged above the strip, of levers beneath the keys, the levers being provided with a varying number of points adapted for engagement with the strip, supports for the strip located between the engaging points of the levers, and an adjustable contact between the keys and corresponding levers, as and for the purpose specified.

5. In a type-writing or similar machine, the combination, with a type-wheel, a strip of yielding material arranged to impart movement to the type-wheel, being connected with the wheel at one end and anchored at the opposite end, and a series of keys arranged above the strip, of a lever for each key, operated by the depression of the key, the levers being provided with a varying number of points arranged for engagement with the strip, an auxiliary lever also arranged for engagement with the said strip, means for operating the auxiliary lever as each key is depressed, and supports for the strip, arranged between the depressing portions of the levers and bearing against the strip at a side opposite to the levers, substantially as described.

6. In a type-writing or similar machine, the combination, with a type-wheel, spring-operated in one direction, a strip of flexible material operating the wheel in another direction, the strip being attached to the wheel and a support independent of the wheel, and keys arranged over the strip, of a lever for each key, said levers being provided with a varying number of points for engagement with the strip, the lever nearest the type-wheel having the greatest number of points, an auxiliary lever also arranged for engagement with the strip, said auxiliary lever being provided with an attached bar extending beneath all of the keys, extensions from the keys, adapted when the keys are depressed to engage with said levers, and devices, substantially as described, for limiting the upward movement of the keys.

7. In a type-writing or similar machine, the combination, with a type-wheel spring-operated in one direction, a strip of flexible material operating the wheel in another direction, the strip being attached to the wheel and a support independent of the wheel, and a series of five keys arranged above the strip, of a lever for each of said five keys, said levers being provided with a varying number of points for engagement with the strip, the lever nearest the type-wheel having the greatest number of points, an auxiliary lever also arranged for engagement with the strip, a pivoted frame attached to the auxiliary lever, extending beneath each of the five keys, an auxiliary key attached to said frame, whereby the auxiliary lever may be independently operated, and contacts between the levers and the keys, as and for the purpose specified.

8. In a type-writing or similar machine, the combination, with a type-wheel spring-operated in one direction, a strip of flexible material operating the wheel in another direction, and a series of five keys arranged above the strip, of an independent lever for each key, having a varying number of points for contact with the strip, an auxiliary lever extending beneath the five keys and operated upon by each of said five keys, and an auxiliary key secured to the frame, whereby the auxiliary lever may be operated independently of the other levers, as and for the purpose specified.

9. In a type-writing or similar machine, a type-wheel consisting of three independent wheels placed one within the other, each of the three wheels comprising a disk and an attached cylindrical zone, the disks and zones being cut away at corresponding sides, forming corresponding openings in what is normally the rear of the wheels, the zones of the wheels having respectively produced thereon capitals, small letters and characters, substantially as described.

10. In a type-writing or similar machine, the combination, with a shaft, and a type-wheel loosely mounted upon said shaft, said wheel comprising three wheels, one located within the other and capable of independent movement, and each wheel being provided with a corresponding cut-away side portion, of a driving-pulley mounted upon the shaft, a disk having locking engagement with the driving-pulley and provided with a post extending in direction of the wheels, arms extending from the post in direction of the hub of each wheel, and springs attached to the arms and the hubs of the wheels, for the purpose specified.

11. In a type-writing or similar machine, the combination, with a shaft, a type-wheel loosely mounted upon the shaft, comprising three independent nested wheels, each having a cut-away rear portion and each provided with an independent hub, a driving-pulley, spring-controlled in one direction, loosely mounted upon the shaft, a disk connected with the driving-pulley, having a hub around which the wheels turn, a post projecting upward from the shaft, arms extending from the post toward the hubs of the wheels, and coiled springs attached to said arms and to the hubs of the wheels, of a strip attached to the pulley and a distant support, devices arranged to act upon the strip and place it under tension, and keys for operating said devices, substantially as described.

12. In a type-writing or similar machine, the combination, with a shaft, a driving-pulley mounted upon the shaft, and a disk attached to the pulley and provided with a sleeve loose upon the shaft, of a type-wheel comprising three independent nested wheels, the hubs of which are mounted to turn upon each other and all the hubs to turn around the sleeve, a post projecting from the pulley-disk, springs carried from the post to the hub of each wheel, and a disk attached to each wheel-hub, said disks being provided with recesses adapted to receive a stop or check mechanism.

13. In a type-writing or similar machine, the combination, with a shaft, a driving-pulley mounted upon the shaft and spring-controlled in one direction, a disk attached to the pulley and provided with a sleeve loose upon the shaft, and a post projected upward from the disk, of a type-wheel comprising three independent nested wheels, the hubs of which are mounted to turn upon each other and all of the hubs around the said sleeve, spiral springs attached to the said post and one to the hub of each wheel, and a disk secured to the hub of each wheel, each disk being provided with a recess adapted to receive a stop or check mechanism and a projection for engagement with the post of the pulley-disk, whereby each wheel when returning from a position to print will not pass its normal position, as specified.

14. In a type-writer or similar machine, a type-wheel consisting of a series of independent nested wheels, each comprising a disk, a hub and a cylindrical zone attached at the peripheral portion of the disk, each zone being arranged to carry letters, figures, signs or characters, each of said independent wheels being provided with a correspondingly-located segmental cut that corresponds to the secant of a circle which serves as a base for the zone.

15. In a type-writing or similar machine, the combination, with a type-wheel consisting of a series of independent nested wheels, each comprising a disk, a cylindrical zone, a hub and a disk secured to the hub, said disks being provided with recesses, a driving-pulley and springs connecting each wheel-hub with the driving-pulley, of a series of keys, a flexible strip secured to the driving-pulley and to a distant support, levers adapted for engagement with the strip and operated from the keys, lock-levers arranged to enter the recesses in the hub-disks of the wheels, slides adjacent to the keys, and a connection, substantially as described, between the slides and the lock-levers.

16. In a type-writing or similar machine, the combination, with a type-wheel consisting of a series of independent nested wheels, each comprising a disk, a cylindrical zone, a hub and a disk secured to the hub, said disks being provided with recesses, a driving-pulley and springs connecting each wheel-hub with the driving-pulley, of a series of keys, a flexible strip secured to the driving-pulley and to a distant support, keys located above the strip, levers operated by the keys, provided with a varying number of points arranged for engagement with the strip, lock-levers capable of movement to and from the hub-disks, being adapted to enter the recesses therein, a tension-controlled trip-plate arranged to operate the lock-levers, and slides carried by sundry of the keys, having movable contact with the trip-plate, substantially as described.

17. In a type-writing or similar machine, the combination, with a type-wheel consisting of a series of independent nested wheels, each comprising a disk, a cylindrical zone, a hub and a disk secured to the hub, said disks being provided with recesses, a driving-pulley and springs connecting each wheel-hub with the driving-pulley, of a series of keys, a flexible strip secured to the driving-pulley and to a distant support, keys located above the strip, levers operated by the keys, provided with a varying number of points arranged for engagement with the strip, lock-levers capable of movement to and from the hub-disks, being adapted to enter the recesses therein, a tension-controlled trip-plate arranged to operate the lock-levers, slides located one upon the first and the other upon the last key, levers controlled by said slides, both levers operating in the same direction, projections from the trip-plate, and a sliding engagement between the slide-levers and projections from the trip-plate.

18. In a type-writing or similar machine, the combination, with a casing, a base-plate at the rear of the casing having arms projected forwardly from its ends, links pivotally connecting the arms with the casing-springs, normally holding the links at an acute angle to the base-plate, a series of keys, and a contact between the links and the keys, of a carrying-plate mounted upon the base-plate, a supporting-plate secured to the carrying-plate, an impression-plate mounted upon the supporting-plate, and a feed-cylinder carried by the impression-plate, substantially as described.

19. In a type-writing or similar machine, a paper-holder consisting of a carriage provided with a supporting-plate, a support for the carriage capable of up-and-down movement, an impression-plate removably mounted upon the supporting-plate, with a feed-cylinder journaled upon said impression-plate, for the purpose set forth.

20. In a type-writing or similar machine, the combination, with a type-wheel having an attached disk provided with a recess adapted to receive a locking device, and another recess for spacing purposes, and means for turning the disk, of a tension-controlled spacing-lever having the section at one side of the fulcrum about half as long as the section at the opposite side of the lever, an arm projecting from the shorter end of the lever, facing the spacing-recess of the disk, the normal space between the said arms and bottom of the spacing-recess being equal to half the width of a type, a spring-motor, a stop for the lever, a pawl carried by the lever, engaging with a ratchet-wheel of the spring-motor, a movable paper-carrier, a controlling device for the motor operated by the paper-holder, and a releasing device for the pawl of the lever also operated from the paper-holder, substantially as described.

21. In a type-writing or similar machine, the combination, with a type-wheel having an attached disk provided with a recess adapted to receive a locking device, a second recess corresponding to the initial position of the first letter upon the type-wheel, and a third and spacing recess and means for turning the disk, of a tension-controlled spacing-lever having one end section about half as long as the other end section, an arm projected from the shorter section of the lever, capable of entering the second and third recesses, the normal space between the said arm and bottom of the spacing-recess being equal to half the width of a type, a spring-motor, a stop for the lever, a pawl carried by the lever and engaging with a ratchet-wheel of the motor, a movable paper-holder, a slide carrying a finger operated by the movement of the paper-holder and operating said motor, a shifting lever for the pawl of the spacing-lever, and means, substantially as described for operating the shifting lever from the paper-holder, as specified.

22. In a type-writing or similar machine, the combination, with a type-wheel and a guard partially surrounding the wheel, of an inking mechanism consisting of two drums at one side of the type-wheel, each drum being provided with an attached gear, shafts upon which the drums are loosely mounted, meshing driving-gear upon said shafts, each shaft being provided with a recess in its upper end, a tension-controlled lever operated by the driving mechanism for the type-wheel, provided with a dog engaging one of the meshing gears, a ribbon extending from one drum to the other, provided with projections near the ends, a pivoted arm carrying a pinion at each end, adapted to alternately engage with gearing of the two drums, and a shifting lever for the arm, operated by the projections upon the ribbon, substantially as described.

23. In a type-writing or a similar machine, the combination, with a type-wheel, a driving mechanism connected with the wheel, drums loosely mounted upon independent shafts, meshing gears loosely mounted upon the shafts, in frictional engagement with the said gears, each drum having a toothed head, and a lever operated by the driving mechanism of the wheel, said lever being provided with a dog engaging with one of said gears, of a pivoted arm, a pinion at each end of the arm, adapted to engage with the driving-gears and teeth of the drums, a ribbon extending from one drum to the other and around the wheel, and a shifting lever for the pivoted arm, operated by the movement of the ribbon, substantially as described.

24. In a type-writing or similar machine, a type-wheel consisting of a plurality of independent sections placed one within the other and each provided with characters or types upon its cylindrical surface or periphery, and means for moving the sections axially to bring any one of them into printing position, all of the sections being cut away at corresponding sides, forming corresponding openings in what is normally the rear of the wheel.

MANUEL S. CARMONA.

Witnesses:
H. F. BENNETT,
J. F. BENNETT.